Patented Apr. 25, 1939

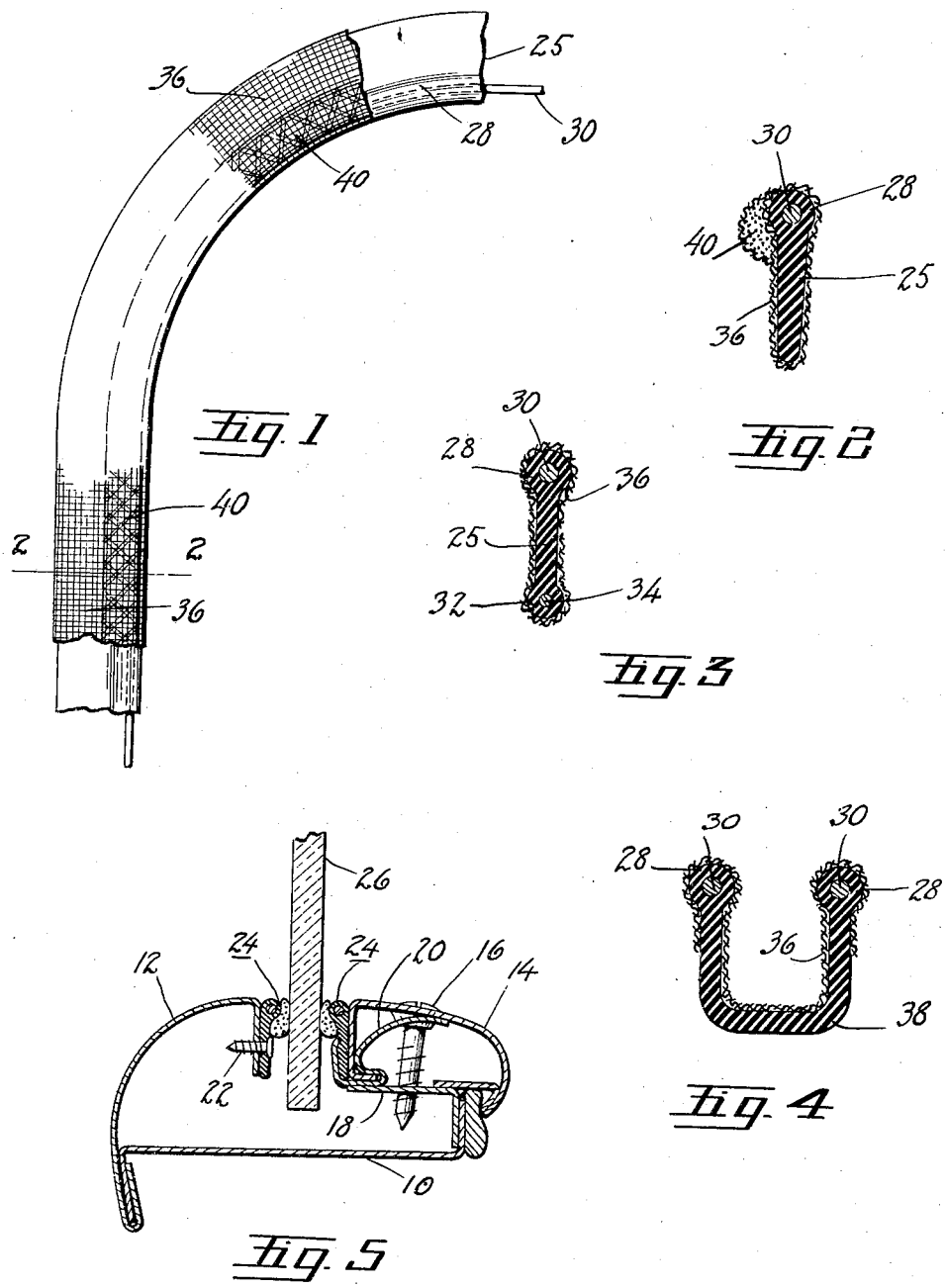

2,155,559

UNITED STATES PATENT OFFICE 2,155,559

GLASS RUN FOR SLIDABLE WINDOWS

Emil B. Lefevre, Detroit, Mich., assignor to Detroit Gasket and Manufacturing Company, Detroit, Mich., a corporation of Michigan Application August 28, 1936, Serial No. 98,359

5 Claims. (Cl. 296—44.5)

This invention relates to improvements in glass runs for slidable window panes and particularly the slidable glass panes employed in automobile bodies.

It has heretofore been a common practice to provide such glass runs in channel form, such channel being mounted within the rabbet of the window frame. The glass pane was supported therein for slidable movement. Such glass runs have also been formed in two sections, each section constituting one side wall strip. These strips were secured in place against opposite side walls of the rabbet in the frame. Said side strips served better to accommodate lateral slidable movement of the glass pane than did the channel type of glass run.

My invention is applicable to a glass run whether of the single slide wall strip type or of the channel type. A primary use, however, is in connection with the side wall strip type of glass run where it is desired to bend the run into a curved shape to conform with a window frame formed on a radius.

My improved strip has a flexible cushion-like body provided with a bead portion extending along its outer margin. The bead has a core formed of a flexible strand of material adapted to normally retain the strip at any deformed shape to which it may be bent to conform with the curvature of the frame rabbet within which the glass run is mounted. Such core is preferably formed of deformable wire. A preferred construction is to provide a strip having a tubular bead along its outer margin with a wire extending slidably through said bead to facilitate free bending of the run. Such wire may, however, be imbedded within the bead and the body of the strip may be formed of rubber cured in situ upon the wire.

If desired the run may be provided with a bead along each linear margin. The bead along the outer margin would preferably be of a greater cross sectional area than the bead along the inner margin. Each bead would be provided with a reinforcing wire.

Suitable covering material extends over the body of the run and particularly over the inner surface which contacts the glass pane. If the body of the run is formed of rubber this covering material not only protects the rubber against deterioration but facilitates the slidable movement of the pane. Such covering material may be so woven as to provide a cushion-like bead portion formed in the covering material itself, which bead portion extends longitudinally along the inner surface of the run projecting inwardly therefrom and directly contacting the slidable glass pane as described in Patent No. 2,083,353, issued June 8, 1937, to Edward T. Tannewitz.

My improved construction is also shown in a glass run of the channel type wherein each side wall is formed as above described and similarly covered.

Other objects, advantages, and meritorious features of my improved glass run will more fully appear from the following description, appended claims and accompanying drawing, wherein:

Figure 1 is an elevation of a fragment of a glass run strip embodying my invention, Fig. 2 is a transverse cross-sectional view through a strip such as shown in Fig. 1, Fig. 3 is a transverse cross-sectional view through a modified form of strip such as shown in Fig. 1, Fig. 4 is a transverse cross-sectional view through a channel glass run embodying my invention, and Fig. 5 is a transverse cross-sectional view through a window frame structure embodying my invention.

This improvement may be embodied as hereinabove set forth in a glass run of the channel type or of the type wherein the two side wall strips are separated from each other. Both forms are illustrated and described. The channel type is shown in Fig. 4. The other type is shown in the other figures of the drawing.

The glass run is mounted as is well understood in a rabbet provided in the window frame assembly. In structural detail these frame assemblies may differ from each other but the particular detail construction of the frame assembly has no specific bearing upon the improvement here claimed. My improved glass run may be employed in any suitable window frame structure. The one illustrated is of a suitable embodiment wherein a door pillar element is indicated as 10. The outside door panel molding is 12. There is a finish strip 14 secured by suitable screws 16 or the like to the door pillar retainer 18 carried by door pillar 10. A clamp 20 is employed to secure the inner glass run strip in place as shown. The outer glass run strip is shown as held in place by screws 22 or the like. In Fig. 5 these glass run strips are indicated in their entirety as 24 and the slidable glass pane as 26. It is common practice at the present time to so mount this slidable pane as to provide for its lateral slidable movement as well as its vertical movement. In such a construction the two piece side wall strip type of glass run is preferable to the channel type as it would be necessary to make the channel of considerable depth to accommodate for this lateral movement.

This invention resides in the improvements in the glass run itself. The glass run elements shown in Figs. 1, 2, and 3 are of the side wall strip type wherein there is a body portion 25 formed of suitable cushioning material such as rubber. This body portion is so formed as to provide a tubular bead 28 along its outer margin. This bead has a diameter greater than the normal thickness of the strip. The bead is reinforced by a strand-like core element 30 which may be formed of flexible wire adapted to permit bending of the strip and adapted to hold the strip at any deformed shape to which it may be bent to conform with the curvature or radius of the frame element within the rabbet on which the strip is mounted. In Fig. 3 the body of the strip is shown as provided with the outer bead 28 and a second bead of less diameter 32 that extends along the inner linear margin. The bead 32 is provided with a core element 34 extending therethrough. This body portion is provided with a finish covering 36. In Figs. 2 and 3 this finish covering is shown as extending entirely over the outer surface of the body portion. It should at least extend over the inner glass engaging surface and preferably the outer exposed bead surface. If the body portion is formed of rubber the provision of the finish covering material facilitates the slidable movement of the glass. Such covering also protects the body portion against deterioration due to exposure.

In the form shown in Fig. 4 the glass run is of the channel type. This channel may be formed of rubber. The body of the channel is indicated as 38. Each outer marginal bead 28 is provided with a core element 30 extending therethrough. This core element is of the character hereinabove described. Covering material 36 extends over the inner surface and down over the outer side walls to a point of concealment between the side wall of the channel and the wall of the rabbet in the frame.

The covering material may be so fabricated as to embody a cushion-like bead portion 40 extending longitudinally of the strip adjacent or slightly below the outer margin and projecting inwardly from the inner surface of the strip so as to form the direct contact with the glass pane. This feature forms the basis of the Tannewitz patent hereinabove identified. It is illustrated in Figs. 1, 2 and 5. In Fig. 5 it is shown deformed by the pressure of the glass pane thereagainst. Figs. 3 and 4 do not show a structure including such feature though obviously it might be included in these structures.

The core element 30 is preferably slidable through the tubular margin 28 of the glass run element though it may be embedded therein by having the rubber molded directly thereabout. The slidable core, however, facilitates bending of the strip or channel to a deformed shape and permits the glass run to accommodate itself more readily to a curved form. If desired, the core element 34 might also be slidably disposed through the inner marginal bead 32 of Fig. 3.

What I claim:

1. In combination with a window frame having a rabbet adapted to receive a glass pane for slidable movement, a glass run mounted within the rabbet to directly engage the slidable pane, said run including a side wall strip formed throughout of rubber and provided with an outer marginal tubular bead, said side wall provided with an interior reinforcement consisting solely of a reinforcing core of deformable wire extending slidably through the tubular bead and a finish covering over said bead.

2. In combination with a window frame having a rabbet adapted to receive a glass pane for slidable movement, a glass run mounted within the rabbet to directly engage the slidable pane and comprising a side wall strip having a body formed of cushioning material provided with an outer tubular marginal portion and a flexible wire extending longitudinally and slidably through said tubular portion.

3. In combination with a window frame having a rabbet adapted to receive a glass pane for slidable movement, a glass run mounted within the rabbet to directly engage the slidable pane and comprising a side wall formed of cushioning material and provided with a bead extending along the inner linear margin and a bead extending along the outer linear margin, said side wall provided with an interior reinforcement consisting entirely of a flexible wire extending longitudinally as a core through each bead.

4. In combination with a window frame having a rabbet adapted to receive a glass pane for slidable movement, a glass run mounted within the rabbet to directly engage the slidable pane and comprising a side wall formed of cushioning material and provided with a bead extending along the inner linear margin and a bead extending along the outer linear margin said side wall provided with an interior reinforcement consisting solely of a flexible permanently deformable wire extending longitudinally as a core through each bead, the wire core extending through the outer marginal bead being slidable therethrough.

5. A glass run comprising a channel shaped body formed throughout of cushioning material and having each side wall provided along its outer edge with an enlarged tubular bead said run body provided with an interior reinforcement consisting solely of a flexible wire extending slidably through each tubular bead.

EMIL B. LEFEVRE.